United States Patent [19]

Lewis et al.

[11] Patent Number: 4,577,333
[45] Date of Patent: Mar. 18, 1986

[54] COMPOSITE SHIFT KEYING COMMUNICATION SYSTEM

[75] Inventors: Kenneth A. Lewis, Essex Junction, Vt.; Alan N. Alpern, Manhattan, N.Y.

[73] Assignee: GridComm Inc., Danbury, Conn.

[21] Appl. No.: 650,777

[22] Filed: Sep. 13, 1984

[51] Int. Cl.$^4$ ........................................... H04L 27/30
[52] U.S. Cl. ..................................... 375/45; 375/51; 375/66; 375/91; 375/104; 329/112; 332/22; 332/23 R; 340/310 R
[58] Field of Search ................... 375/45, 48, 51, 62, 375/66, 88, 89, 91, 104; 332/21, 22, 23 R; 329/112, 135, 136; 340/310 A, 310 R, 825.74; 370/11

[56] References Cited

U.S. PATENT DOCUMENTS

| | | | |
|---|---|---|---|
| 2,154,921 | 4/1939 | Vroom | 375/48 |
| 3,048,657 | 8/1962 | Buff | 370/37 |
| 3,061,783 | 10/1962 | Noller | 375/45 |
| 3,242,480 | 3/1966 | Walker et al. | 375/48 |
| 3,289,152 | 11/1966 | McIlwraith et al. | 367/134 |
| 3,305,634 | 2/1967 | Rusick | 375/20 |
| 3,405,236 | 10/1968 | Nieswinter et al. | 375/45 |
| 3,510,592 | 5/1970 | Menicou | 179/2 DP |
| 3,543,239 | 11/1970 | Wallace, Jr. | 340/825.74 |
| 3,614,620 | 10/1971 | David | 375/48 |
| 3,643,160 | 2/1972 | Ray et al. | 375/48 |
| 3,719,779 | 3/1973 | Wilson | 375/45 |
| 3,810,019 | 5/1974 | Miller | 340/825.74 |
| 3,815,029 | 6/1974 | Wilson | 375/83 |
| 3,849,764 | 11/1974 | Wang et al. | 340/825.74 |
| 3,946,337 | 3/1976 | Philips et al. | 332/22 |
| 3,979,685 | 9/1976 | Motley et al. | 329/105 |
| 3,991,389 | 11/1976 | Dwire et al. | 332/9 R |
| 4,012,734 | 3/1977 | Jagoda et al. | 340/310 A |
| 4,092,606 | 5/1978 | Ryan | 329/124 |
| 4,216,542 | 8/1980 | Hermesmeyer | 375/67 |
| 4,227,405 | 10/1980 | West | 364/422 |
| 4,234,852 | 11/1980 | McCorkle | 375/91 |
| 4,267,591 | 5/1981 | Wissel et al. | 370/11 |
| 4,429,299 | 1/1984 | Kabat et al. | 340/310 A |
| 4,433,422 | 2/1984 | Kurth | 375/104 |
| 4,435,764 | 3/1984 | El-Gohary | 364/200 |

OTHER PUBLICATIONS

Computer Networks, by A. Tanenbaum, 1981, Prentice-Hall, pp. 16-22, 129-133, 164.

Primary Examiner—Robert L. Griffin
Assistant Examiner—Raymond C. Glenny
Attorney, Agent, or Firm—Scully, Scott, Murphy & Presser

[57] ABSTRACT

A Composite Shift Keying (CSK) modulation technique is described which provides enhanced error detection capability in a noisy transmission medium, such as an AC power line. A modulating binary signal causes the generation of two of three possible transmitted signals, and when the modulating binary signal is idle, no signal is transmitted. When the modulating signal is active, a single frequency qualifying signal (of radian frequency Wqt) is transmitted. If the active binary signal is a logical 0, an additional single frequency (of radian frequency W0) is transmitted along with Wqt. If the active binary signal is a logical 1, a different single frequency (of radian frequency W1) is transmitted with Wqt.

22 Claims, 4 Drawing Figures

COMPOSITE SHIFT KEYING COMMUNICATION SYSTEM

BACKGROUND OF THE INVENTION

1. Field of the Invention

The present invention relates generally to a system and method for the communication of information in binary form, such as computer data, through a transmission medium such as existing AC power supply lines, or any other type of conductive waveguide.

2. Discussion of the Prior Art

The prior art has generally recognized the need for communicating substantial amounts of information between remote locations in homes or office or industrial buildings, or even between such buildings. This information can be used to control lighting, heating, air conditioning and other variable factors subject to control from a central location in the building. It allows for the communication of data information among computers, remote terminals, printers and the like.

In many commercial applications, the physical location of computers, such as personal computers and minicomputers, printers and other peripheral equipment presents a major problem with respect to the networking of all of the involved components. Running hardwire to connect all of the components and stations is expensive, and also has the disadvantage of creating an immobile system, often in a dynamic office, plant or home environment.

Moreover, since power wiring already exists in many facilities which require local data transmission, reliable data transmission through this medium would produce significant cost savings in both material and the labor saved by not having to run additional cabling.

Techniques for using existing powerline wiring for communication purposes are described, for example, in the following U.S. Pat. Nos. 3,818,481; 3,876,984; 3,944,723; 3,964,048; 4,065,763; 4,106,0071; 4,174,517; 4,217,646 and 4,222,035. Typically, the information to be communicated is modulated onto a carrier and the carrier is suitably applied to the electric power line. A receiver device is coupled to the electric power line network to each desired receiving location, and each receiver includes a decoder which typically demodulates the carrier to recover the communicated information. The information generally includes an address which identifies a receiver which is being communicated with and also includes data information for controlling the remote devices that are coupled to the respective receivers. Filters have been employed to separate frequency of the carrier from the frequency of the electric power signal. Nevertheless, there is often a problem with an intermixture of the various signals on the power lines which may result in distortion in the information desired to be transmitted.

Experience, in industrial environments has demonstrated the requirement for a method of digital data transmission which provides multiple redundant error detection without adversely affecting the transmission of data. Electromagnetic and radio frequency interference problems make reliable data transmission difficult with many existing data modulation techniques such as Amplitude Shift Keying (ASK) Frequency Shift Keying (FSK), Phase Shift Keying (PSK), and others.

SUMMARY OF THE INVENTION

Accordingly, it is a primary object of the present invention to provide an effective method of communicating binary information over a relatively noisy transmission medium, such as AC power lines, voice grade telephone lines or other cabling in environments containing severe electromagnetic or radio interference.

A further object of the subject invention is the provision of such a binary information communication system for the transfer of digital information in local area networks (LANs) in residential, office automation and manufacturing environments.

An additional object of the present invention is the provision of a binary information communication system which provides enhanced error detection capability with reduced protocol requirements, and increased useful data transmission capabilities. The present invention reduces transmission protocol because it intrinsicly provides for error detection, thereby reducing protocol complexity and overhead.

In accordance with the teachings herein, the present invention provides a Composite Shift Keying (CSK) communication system which combines aspects of both Amplitude Shift Keying (ASK) and Frequency Shift Keying (FSK) to enhance error detection for synchronous or asynchronous serial transmission of binary data in a noisy, transmission medium. Orthogonal multiplexing may also be employed to double the number of discrete channels within a given bandwidth. With CSK modulation, a modulating binary signal causes the generation of two of three possible transmitted signals in phase or 90 degrees or more out of phase. Whenever the modulating binary signal is idle, no signal is transmitted. When the modulating signal is active, a single frequency qualifying signal (of radian frequency Wqt) is transmitted. If the active binary signal is a logical 0, an additional single frequency (of radian frequency W0) is transmitted along with Wqt. If the active binary signal is a logical 1, a different single frequency (of radian frequency W1) is transmitted with Wqt. In either case, the accompanying qualifying signal Wqt establishes the coherent time reference for W0 and W1. In summary, there is a maximum of two transmitted frequencies, with fixed time coherence, when the modulating binary signal is active and no signal is transmitted when the modulating binary signal is idle.

when $b(t) = $ logic 0

$v(t) = A \cos((Wqt) t + p) + A \cos((W_0) t + p)$ when $b(t) = $ logic 1

$v(t) = A \cos((Wqt) t + p) + A \cos((W1) t + p)$ when $b(t) = $ idle $v(t) = 0$ Where:
A and p are constants,
t represents time,
W0, W1, and Wqt are three distinct frequency values, b(t) is the modulating binary signal, and
v(t) is the transmitted CSK signal.

Pursuant to the teachings of the present invention, error detection is achieved by several techniques. First, by the definition of CSK modulation, W0 and W1 must be logical complements of one another. During state transitions of the binary data being transmitted, the logical complementary relationship may be invalid, which necessitates deriving sampling timing data from Wqt and a synchronizing prefix to the transmitted data. With proper sampling synchronization, it can be assumed that a non-complementary relationship between W0 and W1 detectors indicates that a noise induced error has occurred. Secondly, data can be transmitted at a fixed rate in fixed length blocks so that the time interval through which Wqt is active is fixed and known. Therefore, if Wqt becomes inactive before this known time interval has elapsed, an error has occurred. Third, data can be transmitted in known length blocks, so that a checksum or cyclic redundancy check error detection scheme may also be employed. A parity scheme may also be employed at the character level. Transmission of known length data blocks also allows the use of error correction algorithms and data compression techniques. Since this approach may be considered to be block asynchronous, with synchronous data within each block, this approach already achieves some data reduction if the modulating binary input is provided by a standard asynchronous protocol such as RS-232C, since the start and stop bits may be removed from the data stream before transmission.

Upon detection of an error by any of the above techniques, the receiver can signal the transmitter to repeat the data transmission until it is received without errors.

Accordingly, the CSK modulation technique of the present invention, can be used to provide enhanced error detection capability in a noisy transmission medium. This method combined with block transmission protocol can provide highly reliable multidrop data networking capabilities over existing AC power line wires, or any other types of conductive waveguides. Moreover, a communication system pursuant to the subject invention should also be able to reduce the specification requirements and costs of leased lines in long haul or short haul modem applications.

The composite shift keying modulation approach of the present invention copes well with the problems associated with a power line, which generally represents a hostile communication medium at any frequency. On a power line, it is not a question of how to avoid transmission corruption due to noise, but how to deal with its certain eventuality. The present invention addresses this area by maximizing noise immunity, and also by allowing the instantaneous detection of noise corruption of transmitted binary data.

The data communication system of the present invention should also function well in a multichannel distributed environment where computers are wired together. Moreover, the present invention should find significant applications in many relatively small businesses having a 1,000 to 50,000 square foot office facility of personal computer and peripheral networks. Distributed techniques are also used in a multitude of manufacturing processes, mining operations, and robotics where the present invention should find application, thereby substantially reducing the need for hardwiring connections and providing for more complete system flexibility.

The data communication system of the present invention should also find utility in applications wherein audio information can share the AC power lines with the transmitted data, giving the power lines new dimensions for office music, intercoms and security applications. The present invention should be able to provide a reasonable level of music fidelity and excellent voice resolution over suitable speaker systems, which can be merely plugged into receptacles in the power system.

BRIEF DESCRIPTION OF THE DRAWINGS

The foregoing objects and advantages of the present invention for a composite shift keying communication system may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
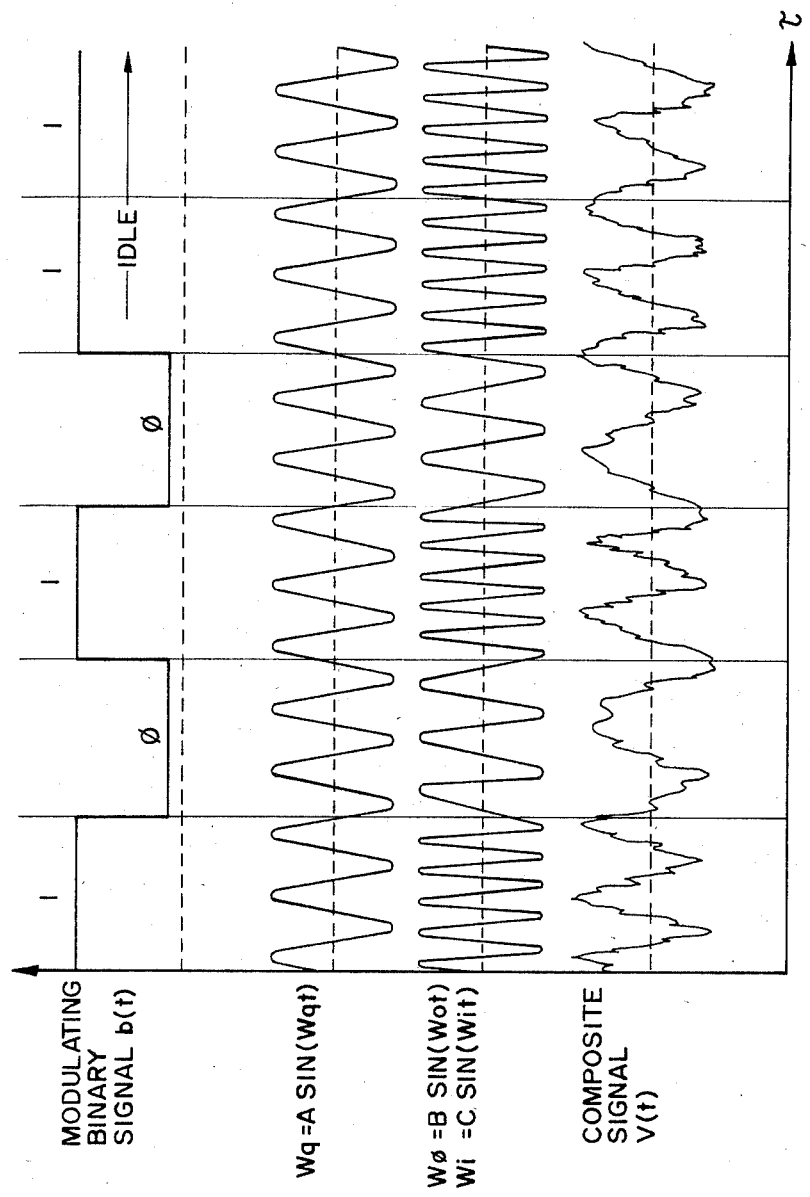
FIG. 1 illustrates several waveforms which are helpful in explaining the principles of operation of the present invention.
Figure 2:
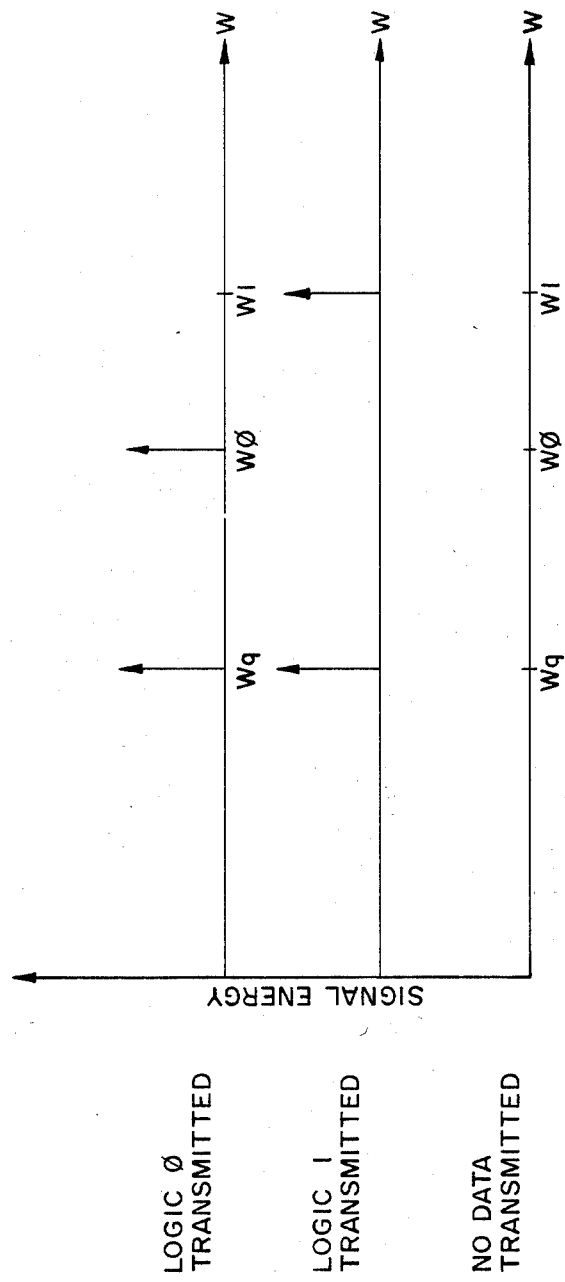
FIG. 2 illustrates a frequency domain explanation of the principles of operation of the subject invention.

Referring to the drawings in detail, FIG. 1 illustrates an exemplary modulating binary signal b(t) to be transmitted and consisting of data bits 0101, followed by an idle period. Pursuant to the teachings of the present invention, the qualifying frequency Wqt is generated during the binary signal 0101, but not during the idle period. A first frequency signal W1 is generated during the presence of a binary 1, while a second frequency signal W0 is generated during the presence of a binary 0. The composite transmitted signal v(t) is the added or combined sum of Wqt and W1 or Wqt and W0. FIG. 2 is a self-explanatory frequency domain illustration of the principles of operation illustrated in FIG. 1.

Figure 3:
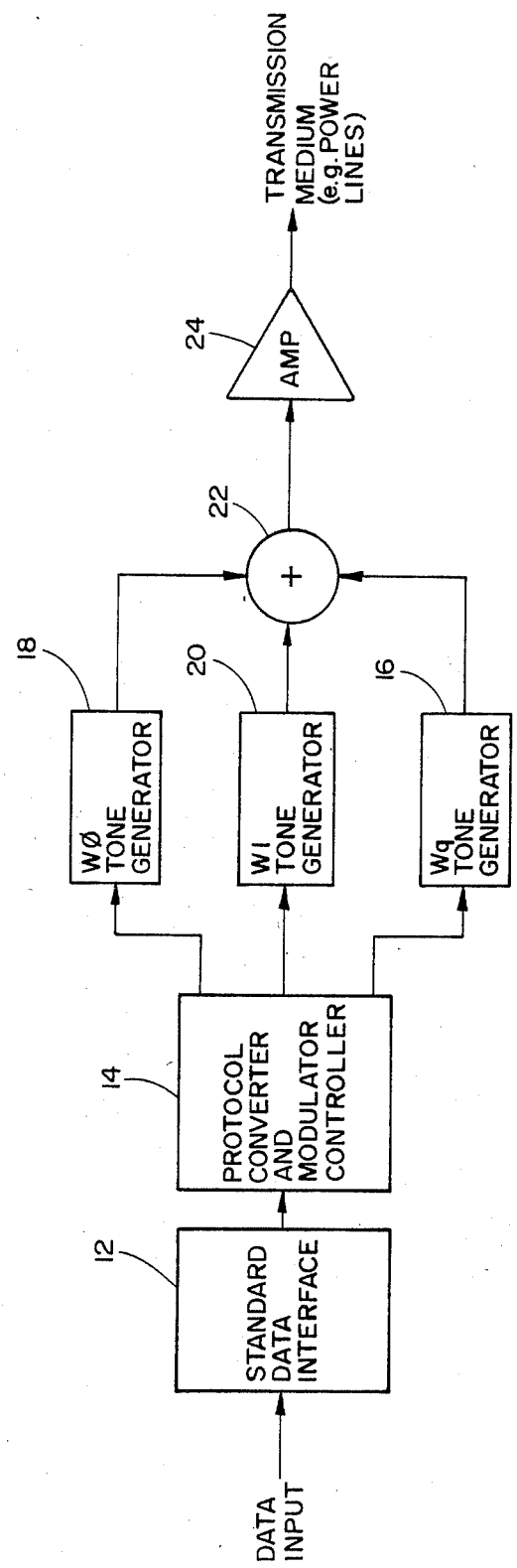
FIG. 3 is an exemplary embodiment of a composite shift key modulator associated with a data transmitter pursuant to the present invention.

FIG. 3 illustrates an exemplary embodiment of a composite shift key modulator associated with a data transmitter pursuant to the present invention. Referring thereto, digital data to be transmitted is initially directed to a standard data interface 12, which could be any of several standard data interfaces known in the industry such as EIA RS-232C, RS-422, RS-423, IEEE-488, or a Centronics parallel printer interface, each of which specifies electrical and mechanical requirements for the interconnection and a protocol for communications. The protocol required for CSK data transmission differs from the protocols used by these standard interfaces, and accordingly a protocol converter and modulator controller 14 converts the standard protocol from the data interface to the CSK protocol.

In essence, the protocol converter untilizes the protocol to receive the binary information, which it retains, but then discards the received protocol, and utilizes a selected CSK protocol with the received data. A block transmission protocol can be advantageously employed with the present invention in which data is transmitted at a fixed rate and in fixed length blocks so that the time interval through which Wqt is active is fixed and known. A handshake signal Wqr may be implemented. The transmission of data in standard length blocks allows a checksum or cyclic redundancy check error detection technique to be utilized. The implementation of an additional signal, a handshaking tone Wqr produced by the receiving unit, further enforces the CSK protocol in a block transmission scheme. Since this approach may be considered to be block asynchronous, with synchronous data within each block, this approach already achieves some data reduction if a standard asynchronous protocol such as RS-232C is utilized since the start, stop and parity bits may be removed from each byte within the data stream before transmission, as it applies to block protocol.

The modulator controller 14 modulates the transmitted data in accordance with the principles of operation illustrated in FIGS. 1 and 2. In a preferred embodiment, the protocol converter and modulator controller 14 can be implemented with a mask programmable single IC microcomputer unit (MCU). This design allows any desired standard data interface to be accommodated with minimal changes to the circuitry.

The modulator controller 14 selectively modulates a Wqt tone generator 16, a W0 tone generator 18, and a W1 tone generator 20, each of which generates a single frequency tone at the respective frequencies Wqt, Wqr, W0 and W1 when activated by the protocol converter and modulator controller 14, and no signal when deactivated. In one advantageous and preferred embodiment, the single tones are generated digitally by recall from a ROM memory, and put through a D/A converter. Essentially, the protocol converter and modulator controller 14 controls the activation of the appropriate tone generators to produce the CSK signals required to transfer the data. The tone generators 16, 18 and 20 can also be implemented as gated oscillators, although many alternative techniques can be utilized to produce the same results.

The particular frequencies of Wqt, Wqr, W0 and W1 are not critical to the present invention. However, in a power line communication system, W0 and W1 would generally be separated by less than 20 KHz, and Wqt and/or Wqr would generally be separated from W0 and W1 by at least 20 KHz. Normally, W0 and W1 would be selected to be higher frequencies than Wqt since W0 and W1 essentially transmit data, and according to data communication theory, higher frequencies allow data to be transmitted at faster rates. As an example only, Wqt, Wqr, W0 and W1 can be selected to be in a low frequency radio wave bandwidth between 50 KHz and 490 KHz. Of course, FCC regulations on available frequencies and bandwidths must also be considered and complied with. In communication systems over other communication mediums, the particular frequencies of Wqt, Wqr, W0 and W1 and the particular bandwidth, would depend upon the parameters of the communication system implementation.

The outputs from the tone generators 16, 18 and 20 are summed at 22 to produce the final CSK signal, which is then amplified by a power amplifier 24 and applied to a transmission medium such as a power line. In the case of a power line medium, an interface stage also could be utilized to couple the amplified CSK signal to and isolate the transmitter from the power line. The amplified output can be dynamically impedance matched to the power line so that as the power line impedance swings, the CSK Signal Voltage remains the same. RF transmitters should be able to cope with line impedances of 1 to 50 ohms with such a dynamic impedance matching technique. The transmitter essentially sees the AC power line as a low impedance, inductive source of infinite length for a carrier in the 50 to 490 KHz bandwidth. Ultra high impedance terminations (i.e. transformers) can be utilized to enhance communication capabilities because there is no need to deal with RF reflection. Simple transformer communication bridges can also be utilized to provide for multiple power system coupling.

Figure 4:
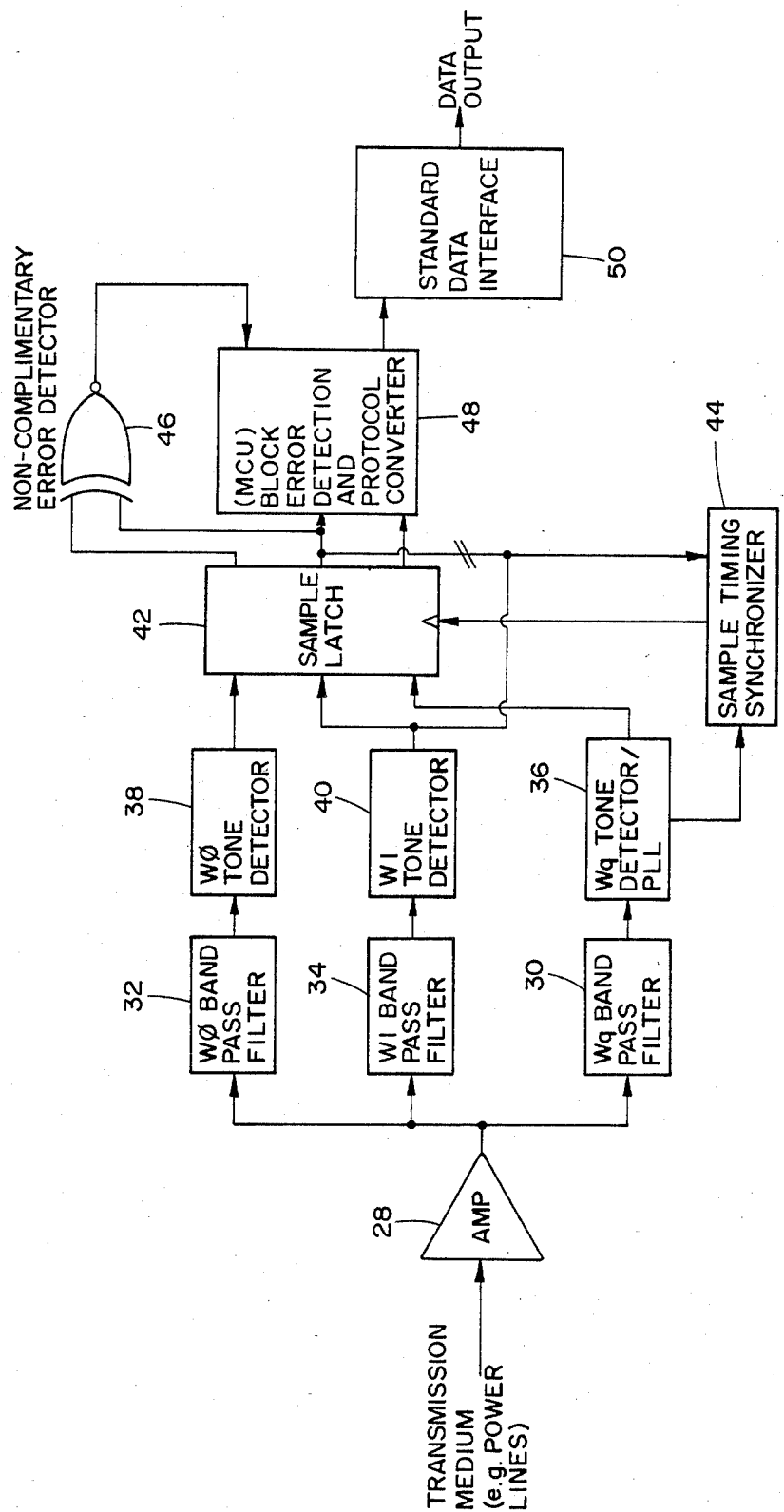
FIG. 4 is an exemplary embodiment of a composite shift key demodulator associated with a data receiver pursuant to the subject invention.

FIG. 4 illustrates an exemplary embodiment of a composite shift key demodulator associated with a data receiver pursuant to the present invention. The signals from the transmission medium are amplified by a preamplifier 28 (which may incorporate therein automatic gain control circuits) to increase the signal level to a more easily detectable level since the transmission medium normally attenuates the signal to a certain extent.

The preamplifier output is applied to three bandpass filters 30, 32, and 34 centered respectively at Wqt, W0 and W1, which reduce the amplitude of extraneous signals delivered to the three tone detectors 36, 38 and 40 for detection of the tones at frequencies Wqt, W0 and W1. The tone detectors indicate the existance or nonexistance of the particular single frequency tone to which they are tuned, and determine the present state of the CSK signal, i.e. which of the three CSK tones are being transmitted.

In order to decode the CSK data stream, which is latched or stored in a Sample Latch 42, the tone decoders must be sampled at the bit transmission rate. This function is performed by a Sample Timing Synchronizer 44. In one advantageous embodiment, Wqt is selected to be related to the bit rate so that it may be used by the receiver as a reference for maintaining phase lock with the transmitter clock. Data synchronization can be established by a short clock run-in at the beginning of a data block (or by start-stop bit techniques if block protocol is not used). As an example, the clock run-in could be simply a transmission of 10101010, which is used by the synchronizer to determine the proper initial sample time, and then Wqt is used to maintain this synchronization for the remainder of the data block.

The W0 and W1 outputs of the sample latch 42 are checked by an exclusive NOR gate 46 to determine that W0 and W1 are complements. With proper sampling synchronization, it can be assumed that a non-complementary relationship between W0 and W1 indicates that a noise induced error has occurred. Data can also be transmitted at a fixed rate and in known length blocks so that the time interval through which Wqt is active is fixed and known. Therefore, if Wqt becomes inactive before this known time interval has elapsed, an error has occurred. A checksum or cyclic rendundancy check error detection scheme may also be employed. A parity scheme can also be employed at the character level. Transmission of known length data blocks also allows the use of error correction algorithms and data compression techniques.

In a preferred embodiment, the block error detection and protocol conversion are performed by a microcomputer unit (MCU) 48. MCU 48 checks for the existance of Wqt at the Wqt sample latch, checks if exclusive NOR gate 46 indicates an error, and accumulates the data stream from the sample latch 42. If a block transmission protocol is employed, MCU 48 also verifies the data stream using a checksum or similar technique. If no errors are indicated, the MCU 48 outputs the data with an appropriate protocol through a standard data interface 50 such as an RS-232C, RS-422, etc.

If block transmission protocol is not utilized, the data can be transmitted asynchronously with Start of Message and End of Message (SOM/EOM) detectors. Detection of an appropriate ASCII character would enable the transmitter output, while detection of no ASCII character would disable the transmitter output.

When the demodulator is part of a transceiver, the MCU 48 can request a selective block retransmit when an error condition is detected. The length of the selected block can be as small as one byte, or as long as desired, depending upon the particular environment and implementation.

It is expected that the principles of the present invention should allow a Local Area Network (LAN) to be implemented at reasonable data speeds up to 9600 bits per second and higher, with very low bit error rates, comparing favorably with equivalent hardwired LAN's. An entire user-friendly system could transmit data, whether in a point to point application or in a local area network, and systems with half or full duplexed channels should be easily implementable and installable.

In summary, the present invention provides enhanced error detection by using a qualifying tone in conjunction with FSK modulation of binary information. The qualifying tone Wqt indicates valid data on the data tones W0 and W1, and W0 and W1 are logical complements of one another when Wqt is active. The present invention provides improved error immunity over standard FSK modulation because is not a constant carrier system. Block transmission protocols employing CSK modulation provide additional error detection and correction capabilities. The subject invention also provides enhanced error detectability over FSK modulation because CSK demodulators employ two tone detectors for data tone detection, allowing for a logical complementary test of the demodulated output and a larger frequency spacing between the data tones W0 and W1. The logical complement test of the data tones W0 and W1 may be accomplished with other appropriate circuitry which provides for the demodulation of the binary data stream while presenting an indication of the existance of both or neither of the data tones. The present invention also provides enhanded error detectability over ASK modulation because energy is transmitted for both logical states of the data. The subject invention can also be combined with orthogonal multiplexing to double the number of data channels within a given bandwidth. The incorporation of orthogonal multiplexing allows an increase in the number of discreet channels, additional detection circuitry would provide for identification of a modulating signal 90 degrees more or less out of phase. The present invention allows many transceivers to share the transmission medium by employing frequency division multiplexing, and by employing a block same transmission protocol allowing for time division multiplexing.

While several embodiments and variations of the present invention for a composite shift keying communication system are described in detail herein, it should be apparent that the disclosure and teachings of the present invention will suggest many alternative designs to those skilled in the art.

What is claimed is:

1. A composite shift key method of communication for binary signals, comprising:
   a. transmitting a summed signal having a qualifying signal at a qualifying signal frequency Wqt as one of the summed signal components only when binary data, either a binary zero or a binary one, is desired to be transmitted, by algebraically summing a first signal at
   b. a first frequency W1 with the qualifying signal at the qualifying signal frequency Wqt, to produce a first summed signal which is transmitted when a binary one is desired to be transmitted, such that a binary one transmitted signal is a composite summed signal of Wqt and W1, and by algebraically summing a second signal at
   c. a second frequency W0 with the qualifying signal at the qualifying signal frequency Wqt, to produce a second summed signal which is transmitted when a binary zero is desired to be transmitted, such that a binary zero transmitted signal is a composite summed signal of Wqt and W0; and
   d. ceasing transmission of the qualifying signal at the qualifying signal frequency Wqt as a transmitted signal or as a component of a composite summed signal when neither a binary zero nor a binary one is desired to be transmitted.

2. A composite shift key method of communication for binary signals as claimed in claim 1 further comprising:
   a. receiving the transmitted signals;
   b. identifying a binary one signal only when the qualifying signal Wqt and the first frequency signal W1 are received simultaneously; and
   c. identifying a binary zero signal only when the qualifying signal Wqt and the second frequency signal W0 are received simultaneously.

3. A composite shift key method of communication for binary signals as claimed in claim 2, said transmitting steps being performed over available AC power supply lines to form a local area communications network.

4. A composite shift key method of communication for binary signals as claimed in claim 3, wherein the frequencies of said qualifying signal Wqt, said first frequency signal W1, and said second frequency signal $W_2$ are selected within the bandwidth of 50 to 490 KHz.

5. A composite shift key method of communication for binary signals as claimed in claim 3, further comprising rejecting a received signal when both the first frequency signal W1, and the second frequency signal W0 are not complementary signals.

6. A composite shift key method of communication for binary signals as claimed in claim 3, comprising transmitting the binary signals by utilizing a block transmission protocol, and receiving the binary signals by verifying the received binary signals for conformance with the block transmission protocol.

7. A composite shift key method of communication for binary signals as claimed in claim 6, further comprising utilizing a block transmission protocol with a handshaking tone Wqr transmitted by a receiver.

8. A composite shift key method of communication for binary signals as claimed in claim 6 further comprising, transmitting a block retransmit signal at the receiver when the received binary signals do not conform to the block transmission protocol.

9. A composite shift key method of communication for binary signals as claimed in claim 6, said block transmission protocol including a checksum signal, and checking the received binary signal block for conformance with the received checksum signal.

10. A composite shift key method of communication for binary signals as claimed in claim 1, said transmitting steps employing a qualifying signal Wqt tone generator, a first frequency W1 tone generator, and a second frequency W0 tone generator, and a signal summing means coupled to the outputs of said tone generators.

11. A composite shift key method of communication for binary signals as claimed in claim 1, said receiving steps employing a qualifying signal Wqt bandpass filter and tone detector, a first frequency W1 bandpass filter and tone detector, and a second frequency W0 bandpass filter and tone detector, a sample timing synchronizer coupled to said qualifying signal Wqt tone detector, and a sample data means coupled to said sample timing synchronizer and all of said tone detectors.

12. A composite shift key communication system for binary signals comprising
a transmitter which transmits a summed signal having a qualifying signal at a qualifying signal frequency Wqt as one of the summed signal components only when binary data, either a binary zero or a binary one, is desired to be transmitted, said transmitter transmitting a first summed signal of a first signal at a first frequency W1 with the qualifying signal at the qualifying signal frequency Wqt, when a binary one is desired to be transmitted, such that a binary one transmitted signal is a composite summed signal of Wqt and W1, and said transmitter transmitting a second summed signal of a second signal at a second frequency W0 with the qualifying signal at the qualifying signal frequency Wqt, when a binary zero is desired to be transmitted, such that a binary zero transmitted signal is a composite summed signal of Wqt and W0, and said transmitter ceasing transmission of the qualifying signal at the qualifying signal frequency Wqt as a transmitted signal or as a component of a composite summed signal when neither a binary zero nor a binary one is desired to be transmitted.

13. A composite shift key method communication system for binary signals as claimed in claim 12, further comprising a receiver for receiving the transmitted signals, said receiver identifying a binary one signal only when the qualifying signal Wqt and the first frequency signal W1 are received simultaneously, and said receiver identifying a binary zero signal only when the qualifying signal Wqt and the second frequency signal W0 are received simultaneously.

14. A composite shift key communication system for binary signals as claimed in claim 13, said transmitter being coupled to available AC power supply lines to form a local area communications network.

15. A composite shift key communication system for binary signals as claimed in claim 14, said transmitter operating with the frequencies of said qualifying signal Wqt, said first signal W1, and said second signal $W_2$ all being in the bandwidth of from 50 to 490 KHz.

16. A composite shift key communication system for binary signals as claimed in claim 14, said receiver rejecting a received signal when both the first frequency signal W1 and the second frequency signal W0 are not complementary signals.

17. A composite shift key communication system for binary signals as claimed in claim 14, said transmitter transmitting the binary signals with a block transmission protocol, and said receiver verifying the received binary signals for conformance with the block transmission protocol.

18. A composite shift key communication system for binary signals as claimed in claim 17, said receiver comprising a transceiver which transmits a block retransmit signal when the received binary signals do not conform to the block transmission protocol.

19. A composite shift key communication system for binary signals as claimed in claim 18, said block transmission protocol having a handshaking tone Wqr associated therewith which is transmitted by said transceiver.

20. A composite shift key communication system for binary signals as claimed in claim 16, said transmitter transmitting a block transmission protocol with a checksum signal, and said receiver checking the received binary signal block for conformance with the received checksum signal.

21. A composite shift key communication system for binary signals as claimed in claim 12, said transmitter comprising a qualifying signal Wqt tone generator, a first frequency W1 tone generator, and a second frequency W0 tone generator, and a signal summing means coupled to all of said tone generators.

22. A composite shift key communication system for binary signals as claimed in claim 12, said receiver comprising a qualifying signal Wqt bandpass filter and tone detector, a first frequency W1 bandpass filter and tone detector, and a second frequency W0 bandpass filter and tone detector, a sample timing synchronizer coupled to said qualifying signal Wqt tone detector, and a sample data means coupled to said sample timing synchronizer and all of said tone generators.

* * * * *